Dec. 7, 1943.  W. S. TANDLER ET AL  2,336,376
PHOTOELECTRIC CONTROL DEVICE
Filed Aug. 2, 1940   3 Sheets-Sheet 1

INVENTOR
WILLIAM S. TANDLER
BY DAVID S. WALKER

Hoguet, Neary & Campbell
ATTORNEYS

Dec. 7, 1943.   W. S. TANDLER ET AL   2,336,376
PHOTOELECTRIC CONTROL DEVICE
Filed Aug. 2, 1940   3 Sheets-Sheet 2

INVENTOR
WILLIAM S. TANDLER
DAVID S. WALKER
BY
Hoguet, Neary + Campbell
ATTORNEYS

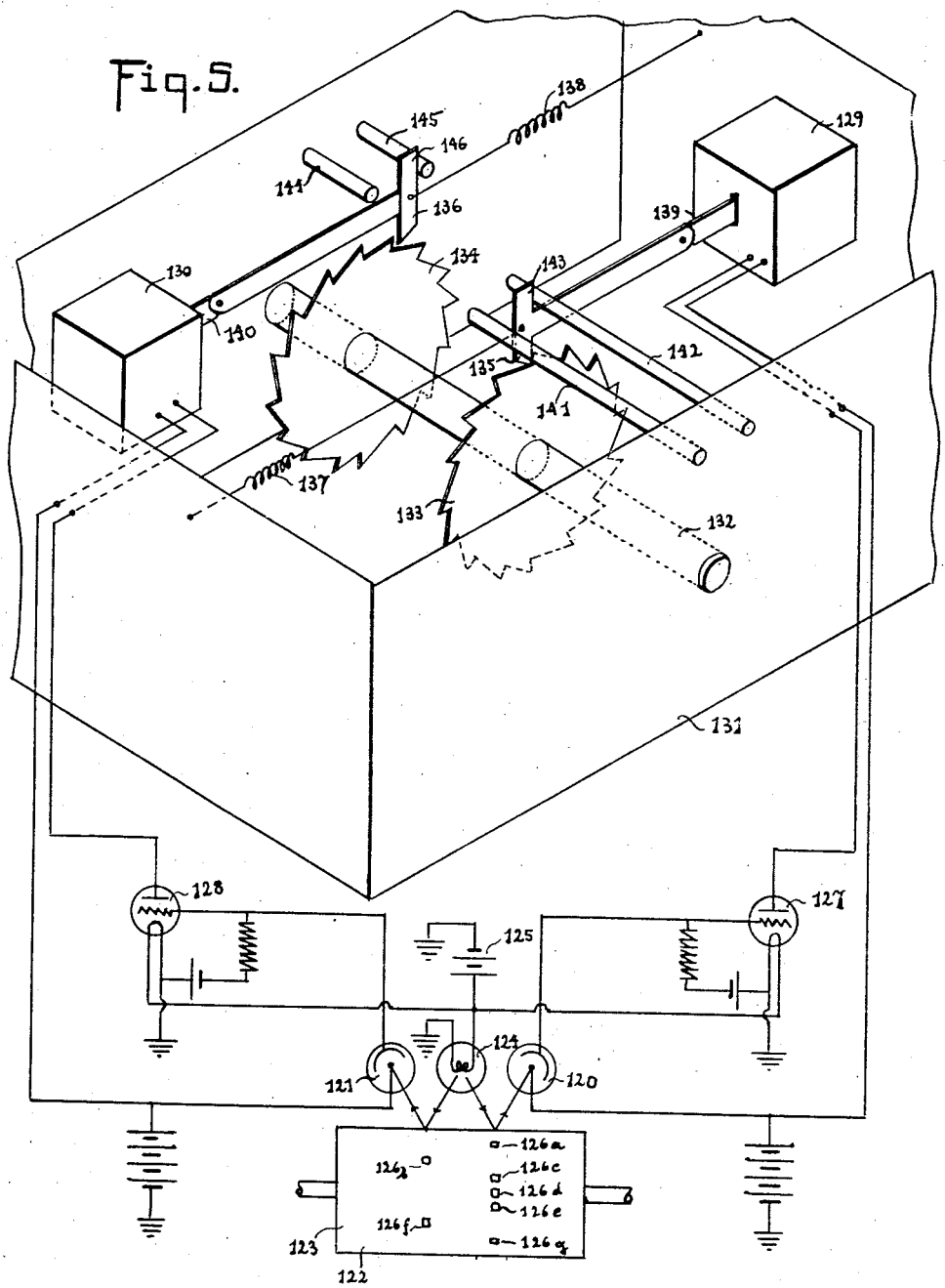

Patented Dec. 7, 1943

2,336,376

UNITED STATES PATENT OFFICE 2,336,376

PHOTOELECTRIC CONTROL DEVICE

William S. Tandler and David S. Walker, New York, N. Y., assignors to Industrial Scientific Corporation, New York, N. Y., a corporation of New York Application August 2, 1940, Serial No. 349,968

5 Claims. (Cl. 250—41.5)

The present invention relates to photoelectric control devices and embodies, more specifically, an improved photoelectric control device by means of which a mechanism, the operation of which involves a plurality of interdependent and selectively controlled elements, may be effectively controlled.

The invention is more especially concerned with an improved control device for mechanisms of the above character, wherein the operation of the plurality of operating mechanisms for such mechanism are controlled by a plurality of photoelectric controls, which serve to control the operating elements and all of which photoelectric control devices are coordinated by a master control of new and improved form.

Mechanisms partaking of compound movement or sequential operations, such as monitoring systems, machine tools and display devices, such as electric signs, have heretofore been controlled by photoelectric control mechanisms that have operated either upon the principle of scanning a pattern resembling the product to be produced by the machine, that is, the scanning of an area of a predetermined formation; upon the principle of interrupting a light beam, as, for example, in the case of a safety device or a guard for a machine; or upon the principle of utilizing a photoelectric mechanism to follow a predetermined track that represents the course a cutter is to follow, the digression of the photoelectric control device from the track causing the control mechanisms to operate to bring the cutter back to a desired course. In causing a mechanism, the operating parts of which are to partake of a predetermined and selected operation in producing a compound movement, each of the above existing systems has been found to give rise to faulty or objectionable results. With a view to providing a more accurate operation of mechanisms of the above character, and to accomplish such operations in a more effective manner, the present invention has been made, and an object of this invention resides in the provision of a mechanism having a plurality of operating elements that are controlled in a more effective fashion than heretofore accomplished.

A further object of the invention is to provide a mechanism of the above character wherein a control device is utilized that includes one or more photoelectric control systems which are adapted to accomplish, effectively, a desired selection of the sequence and duration of operation of the operating elements of the mechanism.

A further object of the invention is to provide a photoelectric control device for mechanisms of the above character wherein an effective coordinating device is provided by means of which the separate photoelectric control devices are actuated in a desired fashion.

A further object of the invention is to provide a photoelectric control device of the above character, wherein the control indicia by means of which the photoelectric controls may be coordinated, may be formed by actuation of the mechanism itself.

The foregoing objects are attained by providing suitable independent photoelectric control circuits each of which is controlled by a photoelectric scanning device operating upon a pre-formed indicia bearing element or upon a plurality of such elements, the actuation of which is coordinated by a common coordinating mechanism. In the embodiments of the invention described herein, the foregoing objects are attained by providing for the control of one or more lamps by means of a photoelectric control system, this photoelectric control system being controlled by the scanning of pre-formed indicia that move with respect to several photoelectric scanning devices, the movement of such indicia being accomplished by a common actuating means. The indicia bearing member may be either in the form of a drum or a web that is driven by a suitable driving element as will be described hereinafter and, in this fashion, a desired selection of the operation of the independent lamps is accomplished.

It will be observed that, in the form of the invention described herein, a single indicia bearing element such as a drum or web is provided, certain portions of which are formed with a track or channel in the form of control indicia. Moreover, the movement of this control element is shown as being unidirectional in character and, for the more convenient and effective operation of the mechanism, the indicia bearing member is operated by a single operating mechanism.

In order that the invention may be understood more fully, reference will now be made to the accompanying drawings, in which:

Fig. 5 is a perspective view of a modified form of device including multiple relays for step by step control of various forms of devices with the photoelectric control circuit being shown diagrammatically.

Figure 1:
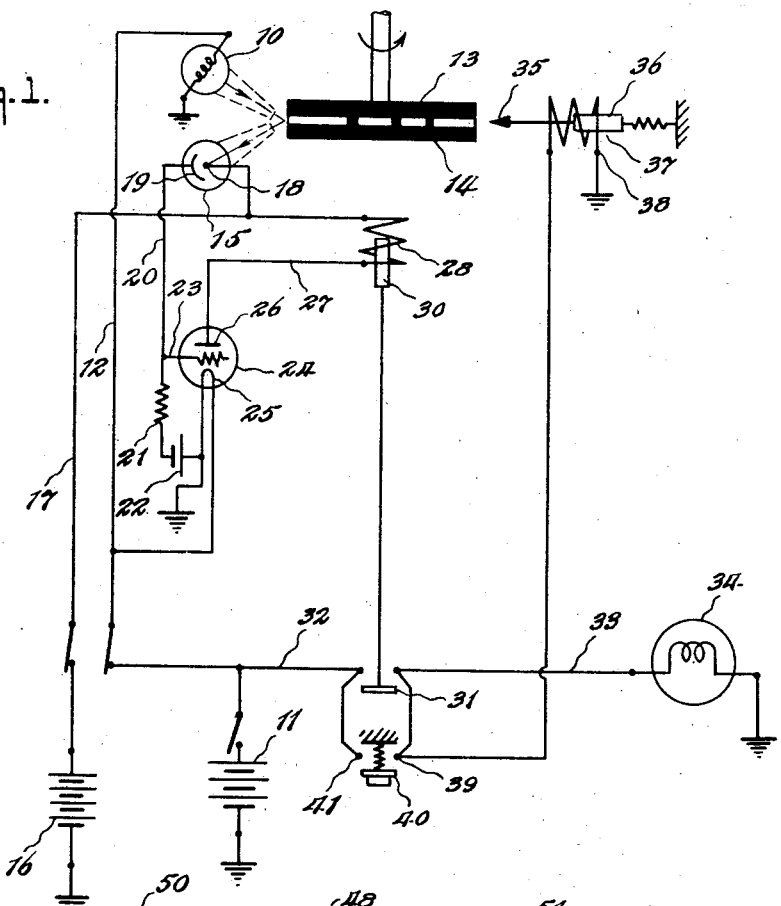
Fig. 1 is a diagrammatic showing of a circuit embodying the invention.

While the photoelectric control system embodying the invention may be applied to many different types of devices for controlling electric motors, relays, clutches and other mechanical operating elements, which may be referred to broadly as a load device the basic circuit of the device is illustrated in Fig. 1 for controlling the lighting and extinguishing of an electric lamp in order to render the description of the circuit more simple.

As shown in Fig. 1 the device includes a light source 10 which may be an ordinary filament type of electric lamp which is energized by a suitable source of electric energy, for example the battery 11. As illustrated, one pole of the battery 11 is grounded and one side of the lamp 10 is grounded, the other pole of the battery and the other side of the lamp being connected by means of a wire 12 thus completing the circuit. The light 10 is arranged to direct a beam upon the surface of a drum 13 upon which is a control chart 14 such as for example a black paper strip having a white interrupted line thereon for controlling the operation of the circuit, as will be described presently. Spaced from the surface of the drum 13 and the lamp 10 is a photoelectric cell 15 upon which light will be reflected by the white line on the chart 14 to thus vary the resistance of the cell 15.

The cell 15 is energized by means of a battery 16 or any other suitable source of electrical energy which is connected by means of a wire 17 to one electrode 18 of the photoelectric cell. The other electrode 19 is connected by a wire 20 through a grid resistance 21 and a battery 22 to ground. Likewise the electrode 19 is connected by a wire 23 to the grid of an amplifying tube 24 to control the amplification of the tube. The filament 25 of the tube 24 is energized by the battery 11. The plate 26 of the amplifying tube 24 is connected by a wire 27 to one terminal of a relay coil 28, the other terminal of the relay coil being connected to the battery 16. The armature 30 of the relay is provided with a conducting element 31 which closes a circuit through the wire 32 connected to the battery 11 and the wire 33 which is connected to the electric lamp 34. The other terminal of the lamp 34 is connected to ground. This lamp serves as a load device which is typical of many devices as hereinabove mentioned.

The operation of this circuit is as follows:

Assuming that the drum 13 is rotated slowly, the beam of light projected by the lamp 10 when it strikes a black portion of the chart 14 will not be reflected and the resistance of the photoelectric cell 15 will not be altered. However, when the beam strikes a portion of the white line on the drum 13, light will be reflected to the photoelectric cell 15, decreasing its resistance, and current supplied by the battery 16 will pass through the photoelectric cell 15, the grid resistor 21 and battery 22 to ground. This renders the grid 23 of the tube 24 more positive and current passes between the filament 25 and the plate 26 thereby energizing the relay coil 28. The relay coil 28 will then attract the armature 30 completing the circuit through the lamp 34 and the battery 11. So long as a white or reflective portion on the chart 14 reflects light to the photocell 15 the lamp 34 will remain lighted. When the white or reflective portion on the chart 14 passes from beneath the lamp and no light is reflected to the photocell 15, the relay coil 28 will be de-energized and the circuit between the battery 11 and the lamp 34 will be broken.

From the foregoing description it will be apparent that by varying the lengths of the white or reflective markings on the chart 14, the length of time that the lamp 34 is lighted will be varied.

Similarly, if it is desired to operate a motor intermittently and over varying periods of time the motor may be connected in the circuit in the same way as the electric light 34 and thus a positive control of the operation of such a motor can be obtained.

The markings on the chart 14 may be applied by hand, if desired, but a more positive control of the length of these markings can be obtained by means of a stylus 35, which may be either a device for engraving a line on a metallic surface coated, for example, with lamp black, or a pen for applying white ink to a non-reflective black surface. The stylus 35 is mounted on the armature 36 of a solenoid 37, the coil 38 of which is connected between ground and one contact 39 of the switch 40. The contact 39 is also connected to the wire 33. The other contact 41 of the switch 40 is connected to the wire 32 thus bridging the contact element 31 of the relay 28 when the switch 40 is closed. When the switch is closed, the light bulb 34 is energized and the solenoid 37 is energized to force the stylus 35 against the surface of the drum 13 or chart 14. The photocell is disconnected from the circuit when the switch 40 is closed. In this way, by timing the period of illumination while the drum 13 is driven, appropriate markings can be applied to the surface of the drum which may be duplicated by the operation of the photoelectric cell circuit.

For periods of operation of short duration a single control line around the periphery of the drum 13 may be used entirely satisfactorily. However, when the operation is of more prolonged nature it may be desirable to arrange the markings of reflective and non-reflective nature helically around the drum thus permitting a plurality of convolutions of the markings to be made on a single cylindrical surface.

Figure 2:
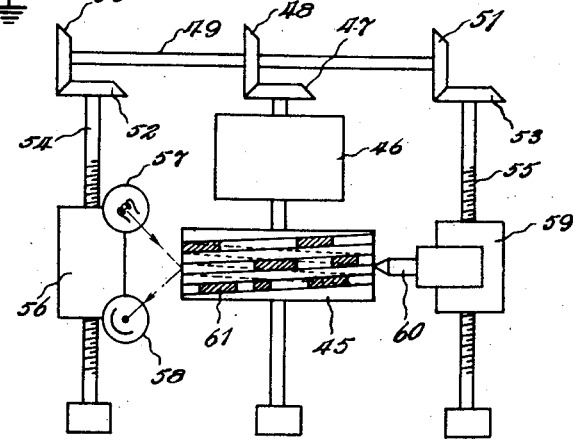
Fig. 2 is a plan view of a modified form of scanning device.

A device for scribing and repeating such helically arranged marking is disclosed in Fig. 2. In this form of device the drum 45 is rotated in any desired way, for example, by means of a motor 46 which likewise drives a bevel gear 47 meshing with a second bevel gear 48 on a transverse shaft 49. The shaft 49 is provided at opposite ends with bevel gears 50 and 51 which by means of meshing bevel gears 52 and 53 drive parallel threaded shafts 54 and 55 at the same number of revolutions per minute as the drum 45.

The shaft 54 supports a carriage 56 on which are positioned the light source 57 and the photoelectric cell 58, the threaded portions of the shaft 54 being so arranged as to cause the carriage 56 to move at a uniform rate of speed parallel to the axis of the drum 45.

The shaft 55 also drives a carriage 59 on which is mounted the stylus 60, the threaded portion of this shaft being threaded identically with the threaded portion of the shaft 54 thereby causing the stylus to move along the drum at exactly the same rate of speed as the carriage 56.

With this arrangement, an appropriate marking or channel 61 can be applied to the face of the drum 45 in the form of a spiral marking consisting of reflective and non-reflective areas. After this marking has been applied the carriage 56 may be passed in front of the drum 45 and photoelectric cell 58 will receive light reflected from the reflective portions of the marking 61 and translate these impulses into energy which may be utilized for operating, for example, a light bulb 34 or any other type of device.

Figure 3:
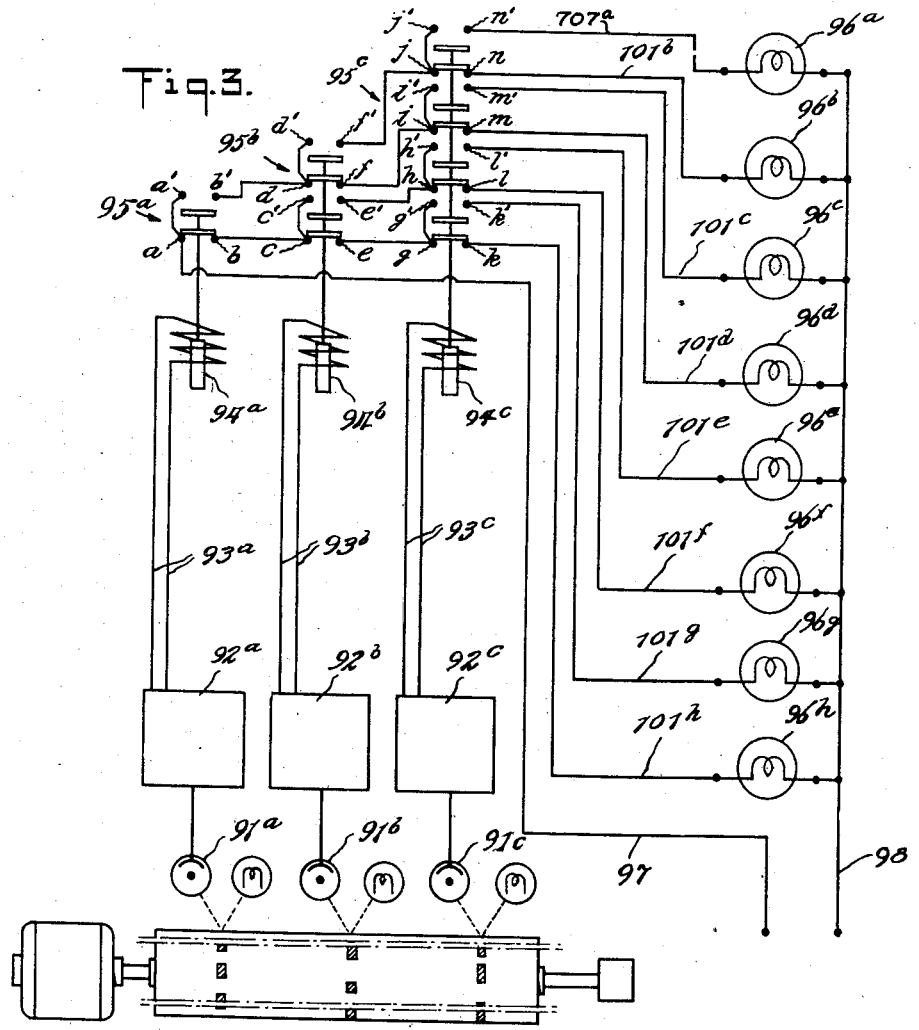
Fig. 3 is a diagrammatic showing of a circuit utilizing a plurality of the scanning devices for controlling the operation of a large number of devices.

By way of example of one application of my control circuit to the control of a plurality of devices, Fig. 3 discloses a circuit in which a plurality of lamp bulbs may be illuminated successively through the use of only three photoelectric cells. In this figure of the drawings is shown a cascade system of controlling the lighting of eight lamp bulbs by means of three photoelectric cells 91a, 91b and 91c. The photocells 91a, 91b and 91c are connected to the amplifiers 92a, 92b and 92c through the pairs of wires 93a, 93b and 93c to the relays 94a, 94b and 94c. The relay 94a has single pole double-throw contacts 95a, the relay 94b has double pole double-throw contacts 95b and the relay 94c has four pole double-throw contacts 95c. The two output contacts b and b' of the relay 95a are connected to the input terminals c, c' and d, d', respectively, of the relay 95b whose four output contacts terminals e, e', f and f' are connected to the four pairs of input terminals g, g'; h, h'; i, i' and j, j' of the relay 95c. The eight output contacts n', n, m', m, l', l, k' and k of the relay 95c are connected to the lamps 96a to h, respectively, through the wires 101a to h. Power is supplied to the input terminal of the relay 95a and to one terminal of each of the light bulbs 96a to h, through the wires 97 and 98.

In operation, assuming that no light is reflected on the photocells 91a, 91b and 91c, the relays will connect across the lowermost terminals a, b, c, e, g, and k of the relay contacts 95a, 95b and 95c and the current will thus flow through from the terminal 97 to the lowermost contacts of each of these relays through the lamp 96h and to the terminal 98 thus completing the circuit and causing the lamp 96h to light. The remaining lamps will not be lighted. If the photocell 91a is activated by a reflective portion of a chart passing in front of it, the coil 94a will be energized thus opening the bottom contacts of the relay and closing the top contacts. Current will then flow from the terminal 97 through the contacts a' and b' of the relay 95a, the contacts d and f of the relay 95b, the contacts i and m of the relay 95c and thence through lamp 96d causing this lamp to light while the others remain dark. Similarly, by energizing the different photoelectric cells 91a, 91b and 91c in various combinations, different light bulbs 96a to h will be lighted while the others remain dark. Thus, by passing a suitable chart before the photoelectric cells 91a, 91b and 91c it is possible to cause the lamps to be lighted in any desired sequence and to maintain these lamps illuminated over any predetermined periods of time.

It will be understood that the circuit described above may be used with great facility in the operation, for example, of electric signs in which different groups of electric light bulbs are illuminated at different times and also to control the operation of a plurality of different devices in order to produce a series of operations.

While the forms of the invention described above are dependent upon a continued reflection of light from a portion of a chart corresponding to a definite duration of controlled actions, the circuit may be so arranged that a small spot on a strip or chart providing a momentary light impulse will be sufficient to change a relay from one position to another. A simple form of relay for this purpose is disclosed in Fig. 4 of the drawings. Relays of this type may be substituted for the electric lamps 96a to h, as disclosed in Fig. 3 and the leads 101a and 98 correspond to similarly identified leads or terminals in the preceding figure. The power supply lines 101a and 98 are connected to a solenoid coil 103 having a cooperating armature 104 which is provided with a spring 105 for urging the armature normally to the right, as viewed in Fig. 4. A pawl 106 is mounted on the right hand end of the armature and cooperates with the ratchet 107 which is mounted on a shaft 108. The shaft 108 also carries a commutator element 109 which is adapted to bridge across the terminals 110 and 111 and the terminals 112 and 113. The terminals 110 and 113 are connected by a wire 114 while the terminals 111 and 112 are connected by a wire 115. The wire 114 is connected to a wire 115' and through a lamp 96a to a power terminal 116. The circuit through the lamp and the source of power supply is completed by a wire 117 connected to the other terminal 118 of a current supply and the wire 115. The two sets of terminals 110 and 111, and 112 and 113 are spaced 180° apart. The ratchet 107 is provided with four teeth which permit it to be rotated in 90° steps. Therefore, when the solenoid coil 103 is energized, the commutator 109 is moved from the position shown in Figure 4 bridging contacts 110 and 111 to a position out of engagement with either set of contacts 110 and 111 or 112 and 113. The next impulse received at the solenoid 103 will cause another quarter turn of the commutator 109 thus bridging the contacts 112 and 113 and again completing the circuit through the light bulb 96. Thus with this circuit each time a reflective spot passes before the photoelectric cell the lamp or other device will either be connected to or disconnected from the power source.

Figure 4:
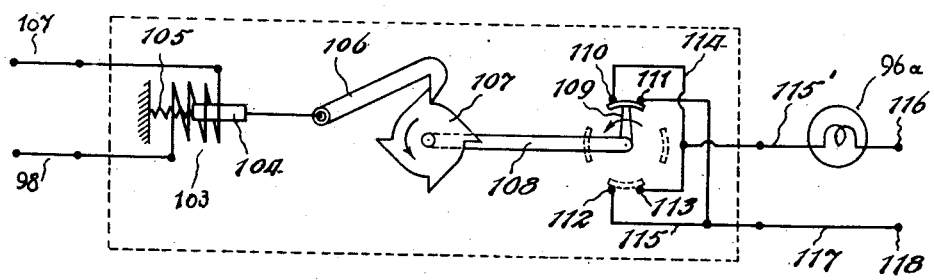
Fig. 4 is a view in side elevation of a modified form of relay for use in the circuit of the device disclosed in Figs. 1 and 3.

The form of the invention disclosed in Fig. 5 is similar to that disclosed in Fig. 4 in that a series of spots are used to energize the system. However, instead of single spots being used to cause an operation to begin or end, the photoelectric device is responsive to groups of one or more spots.

In this form of device the circuit for the photoelectric cells 120 and 121 is similar to that disclosed in Fig. 1. The resistances of the cells 120 and 121 are varied by passage before them of a chart 122 which may be supported, for example, on the drum 123 which is rotated in front of the cells. The chart 122 is illuminated by the lamp 124 which is energized by the battery or other source of current 125. As the chart 122 is rotated before the cells 120 and 121 the spots 126 will reflect light to their respective cells 120 or 121 and as previously described will cause the vacuum tubes 127 and 128 to permit current to flow to the solenoid coils 129 or 130.

The coils 129 and 130 are mounted at opposite ends of a frame 131 in which is journalled a shaft 132 having ratchets 133 and 134 thereon. The teeth of the ratchet 133 are directed oppositely to the teeth of ratchet 134 so that the shaft 132 can be rotated in opposite directions by the pawls 135 and 136 which are reciprocated by the solenoid coils 129 and 130, and the springs 137 and 138, respectively. The pawls 135 and 136 are extensions of the armatures 139 and 140, respectively, for the solenoids and are constrained to straight line movement so that they can engage a tooth of their corresponding ratchets 133 and 134 during only a portion of their reciprocating movement.

The movement of the pawl 135 is restricted by a pair of stop members 141 and 142 on the frame 131 which engage upwardly projecting lug 143 on the pawl 135. Similarly, movement of the pawl 136 is limited by the stop members 144 and 145 which engage the upwardly projecting lug 146 on the pawl 136. The stop members 141 and 145 are disposed so that when the lugs 143 and 146 engage them, respectively, the pawls 135 and 136 are entirely out of engagement with the ratchets 133 and 134. However, as the pawl 135 moves toward the stop member 142 when the solenoid coil 129 is energized, the ratchet 133 will be rotated one step in a clockwise direction.

When the solenoid 130 is energized the pawl 136 is moved to the left, engaging a tooth of the ratchet 134 and rotating the shaft 132 in a counter-clockwise direction.

The direction of rotation of the shaft 132 and the extent of its rotation, therefore, may be controlled by the number of spots 126 on the chart 122. If, for example, a chart having the arrangement of spots 126 shown in Fig. 5 is rotated before the cells 120 and 121 it will be seen that the order of operation is as follows:

Cell 121 will be energized by the uppermost spot 126a in the right hand column causing the shaft 132 to be rotated one step clockwise. The spot 126b in the left hand column will then cause the solenoid 130 to be energized, rotating the shaft 132 one step in a counter-clockwise direction. The three spots 126c, 126d and 126e will cause the shaft to be rotated three steps clockwise; the spot 126f one step counter-clockwise; and the spot 126g one step clockwise.

Rotation of the shaft 132 can be utilized to operate rheostats, potentiometers, switches or the like, or a mechanical drive giving extreme precision and absolute control over the operation of substantially any desired type of device.

From the foregoing description of the various forms of circuits embodying the present invention it will be apparent that my invention has many practical applications and that it may be used to control any desired number of various operations or machines in order to provide predetermined sequence of operations. Therefore, it should be understood that the applications of my circuit described above should be considered as illustrative only, and not as limiting the scope of the following claims.

We claim:

1. A mechanism having an operating element, electro-responsive means for controlling said operating element, a photo-electric device, a circuit connecting the photo-electric device to said electro-responsive means, a movable member adapted to bear an indicia receiving member thereon for controlling the energization of said photoelectric device and actuating said electro-responsive means, means for moving said movable member to cause said indicia receiving member to pass before said photoelectric device, an electro-responsive marking device for applying indicia to said indicia receiving member, manually operated means, a circuit connecting the manually operated means directly in operative relationship with the operating element, and a separate circuit for connecting the manually operated means directly to the marking device for causing operation of said operating element and simultaneously actuating said marking device to apply an indicium to to said indicia receiving member corresponding to the duration of operation of said operating element.

2. A photoelectric control device comprising a load device, a manual controller, means operated by said controller for producing a sequence of energized and deenergized periods of said load device, a moving light-absorbing recording medium, means responsive to actuation of said controller for producing a light-reflecting record on said medium simultaneously with and corresponding to said energized periods, means for projecting a light beam on said record, and photoelectric pick-up means responsive to light reflected from said light-reflecting record for actuating said load device to repeat said sequence, whereby any desired sequence of operations of said device may be repeated in response to a manually-controlled traversing of said sequence.

3. A photoelectric control device comprising a load device, manually-controlled means for running said load device through a sequence of energized and de-energized periods, means simultaneously operated with said manually-controlled means for producing a light-reflecting record corresponding to said energized periods, and photoelectric means controlled by said record for actuating said load device to repeat said sequence, whereby any desired sequence of operations of said device may be repeated in response to a manually controlled traversing of said sequence.

4. The method of photoelectric control comprising the steps of manually controlling the energization of a load device to execute a desired sequence of operations, simultaneously thereby producing a light-reflecting record corresponding to said sequence, scanning said record by a light beam, controlling a photoelectric cell by the light reflected from said record, and actuating said load device under the control of said cell to repeat said sequence, whereby any desired sequence of operations of said load device may be automatically repeated in response to manually executing said sequence.

5. The method of photoelectric control comprising the steps of manually controlling the energization of a load device to execute a desired sequence of operations, simultaneously thereby producing a photoelectric record corresponding to said sequence, and actuating said load device under the control of said record to repeat said sequence, whereby any desired sequence of operations of said load device may be automatically repeated in response to manually executing said sequence.

DAVID S. WALKER.
WILLIAM S. TANDLER.